(12) United States Patent
Brooks

(10) Patent No.: US 12,172,882 B2
(45) Date of Patent: Dec. 24, 2024

(54) CANNING FUNNEL WITH HEADSPACE GAUGE

(71) Applicant: National Presto Industries, Inc., Eau Claire, WI (US)

(72) Inventor: Logan Brooks, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 114 days.

(21) Appl. No.: 17/974,748

(22) Filed: Oct. 27, 2022

(65) Prior Publication Data

US 2024/0140773 A1 May 2, 2024

(51) Int. Cl.
*B67C 11/02* (2006.01)
*G01F 23/02* (2006.01)
*B67C 11/00* (2006.01)

(52) U.S. Cl.
CPC .............. *B67C 11/02* (2013.01); *G01F 23/02* (2013.01); *B67C 11/00* (2013.01)

(58) Field of Classification Search
CPC .......... B67C 11/00; B67C 11/02; G01F 23/02
USPC ............................................................ 141/1
See application file for complete search history.

(56) References Cited

U.S. PATENT DOCUMENTS

| | | | | |
|---|---|---|---|---|
| 475,874 A * | 5/1892 | Leggett | .................... | B67C 11/02 |
| 790,463 A * | 5/1905 | Taliaferro | ................ | B67C 11/02 |
| 1,368,640 A * | 2/1921 | Melchior | ................. | B67C 11/02 D7/700 |
| 3,982,570 A * | 9/1976 | Devoe | ...................... | B67C 11/02 D7/700 |
| 4,334,557 A * | 6/1982 | YaSenka | ................. | B26D 3/185 30/304 |
| 5,228,488 A * | 7/1993 | Fletcher | ................... | B67C 11/04 222/548 |
| 5,662,249 A * | 9/1997 | Grosse | ................... | B65D 51/24 141/381 |
| 5,762,120 A * | 6/1998 | Smith | ..................... | B67C 11/02 141/331 |
| 5,927,353 A * | 7/1999 | Persson | ................... | B65B 39/00 141/331 |
| 7,721,774 B2 * | 5/2010 | Cook | ...................... | B67C 11/02 D7/700 |
| 8,826,949 B2 * | 9/2014 | Kent | ....................... | B67C 11/02 141/342 |
| 9,845,233 B1 * | 12/2017 | Stibinger | ................ | B67C 11/02 |
| 2011/0308667 A1 * | 12/2011 | Gallegos | ................. | B67C 11/02 141/340 |

(Continued)

*Primary Examiner* — Kenneth Rinehart
*Assistant Examiner* — Stephanie A Shrieves
(74) *Attorney, Agent, or Firm* — Kenneth A. Smith

(57) ABSTRACT

Disclosed is a canning funnel with an integral headspace gauge, the canning funnel includes a receiving bowl, an outer base, and a positioning portion which when used with a canning jar, protrudes into the opening of the canning jar to guide foodstuffs from the receiving bowl into the canning jar. The positioning portion is formed with horizontal steps that form a headspace gauge, the steps indicating predetermined distances from the top edge of the canning jar so that when in use, liquid or foodstuffs can be added until a required amount of space is formed between the foodstuffs or liquid and the top edge of the canning jar. The horizontal steps being viewable by a user when the canning funnel is positioned on a canning jar for use.

15 Claims, 9 Drawing Sheets

(56) References Cited

U.S. PATENT DOCUMENTS

| | | | |
|---|---|---|---|
| 2013/0248045 A1* | 9/2013 | Williams | B01L 3/508 |
| | | | 206/525 |
| 2019/0257512 A1* | 8/2019 | Dunphy | F21V 37/0012 |

* cited by examiner

CANNING FUNNEL WITH HEADSPACE GAUGE

CROSS-REFERENCE TO RELATED APPLICATIONS

This application makes no claim of priority.

TECHNICAL FIELD

The present invention is directed to the field of food preservation through the use of canners and methods of their use. More specifically, the present invention is directed to a funnel for filling canning jars, the funnel being configured with a headspace gauge and methods for use of such a funnel.

BACKGROUND

Canning has long been used to preserve foods. While canning is often performed on a commercial scale, canning is also frequently performed in home kitchens. While canning is safe when performed properly, it is extremely important to follow recommended procedures carefully. The United States Department of Agriculture (USDA) offers a detailed guide entitled "Complete Guide to Home Canning", the current edition (revised 2015) is incorporated herein by reference. Those canning foodstuffs are encouraged to closely follow the guidance provided by the USDA. In particular, the Complete Guide to Home Canning describes a space formed between the food in a canning jar and the top edge of the jar and thus the jar lid is called headspace. This headspace provides for the expansion of the food place in the jar. The amount of headspace varies depending upon the type of foodstuff being canned. For example, ¼ inch is prescribed for Jams and Jellies and 1% for fruits and tomatoes processed by a boiling water canning method and 1 to 1¼ inch for low acid foods processed in a pressure canner. Generally canning jars are filled with foodstuffs and liquid using a funnel. A person performing the canning process is required to monitor the headspace while filling the canning jars but conventional funnels make this difficult because they impair the person's view of the foodstuffs and liquids and require that the funnel be withdrawn to check the level of foodstuffs and or liquid in the canning jar. What is needed is a device which allows a person canning foodstuffs to monitor the amount of headspace while the canning jars are filled so as to stop filling before the required amount of headspace is lost.

SUMMARY

Embodiments relate to funnel devices which allow for filling canning jars with foodstuffs, liquids, or a combination of both where the funnel device provides a gauge useful for creating a space between the lid of a canning jar and the foodstuffs and/or liquids.

A funnel device according to an exemplary embodiment comprises a receiving bowl having an upper rim and a neck portion, a tubular inner positioning portion extending from the neck portion in a direction away from the receiving bowl, an outer base affixed to the receiving bowl and coaxial to the inner positioning portion, a flange portion located between the outer base and the inner positioning portion. The flange portion is arranged such that the funnel device may be supported by an upper surface of a canning jar during use, the inner positioning portion having a first opening formed in a side wall of the inner positioning portion. The first opening having an edge formed at a point along the opening such that at least three edges are formed by the opening, the formed edges being parallel to the diameter of the flange portion.

In another exemplary embodiment, a funnel device comprises a receiving bowl having an upper rim and a neck portion. In such an embodiment, a tubular inner positioning portion extending from the neck portion in a direction away from the receiving bowl. A transparent outer base is affixed to the receiving bowl and coaxial to the inner positioning portion. A flange portion is positioned between the outer base and the inner positioning portion, the flange portion comprising radial ribs that provide surfaces arranged such that the device may be supported on the radial ribs by an upper surface of a canning jar during use. The tubular inner positioning portion having two openings formed in a side wall of the inner positioning portion, the second opening being diametrically opposed to the first opening. The openings also having an edge formed at a point along the opening such that at least three edges are formed by the opening, the formed edges being perpendicular to an axis of the neck portion of the receiving bowl.

The above summary is not intended to describe each illustrated embodiment or every implementation of the invention. Rather, the exemplary embodiments are chosen and described so as to provide an overview or framework for understanding the nature and character of the claimed aspects and implementations so that those skilled in the art can appreciate and understand the principles and practices of the invention. The Figures and the detailed description that follow more particularly exemplify these exemplary embodiments, and are incorporated in and constitute a part of this specification.

BRIEF DESCRIPTION OF THE DRAWINGS

These and other features and advantages of the present invention will become better understood with regard to the following description and accompanying drawings in which.

Figure 1:
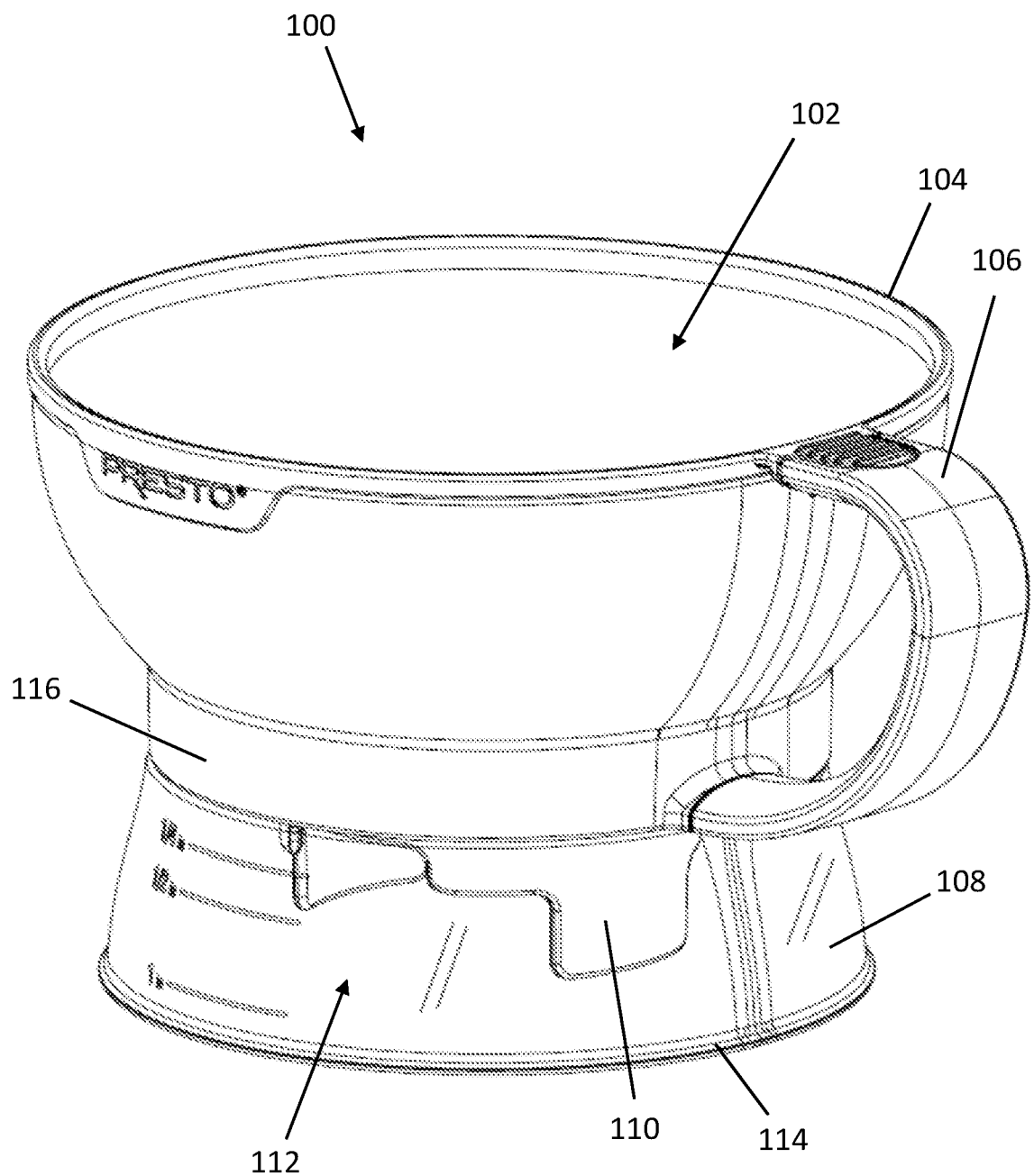
FIG. 1 is a top-right perspective view of a funnel device according to an exemplary embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

An exemplary embodiment of a funnel device 100 for canning is illustrated in FIG. 1. As shown, the exemplary funnel device 100 comprises a receiving bowl 102, an upper rim 104, a handle 106, an outer base 108, an inner positioning portion 110, and a scale 112. In at least one exemplary embodiment, the outer base 108 has a lower rim 114 that enables the funnel device 100 to be rested on a flat surface. Not all embodiments will comprise a handle 106 and the shape of the handle 106 illustrated is exemplary. Thus, in certain other embodiments, the handle 106 may be formed differently or omitted altogether. Also illustrated is a neck portion 116. In certain exemplary embodiments this neck portion 116 may not be present and in such embodiments, the outer surface of the receiving bowl 102 may transition directly into the outer base 108.

Figure 2:
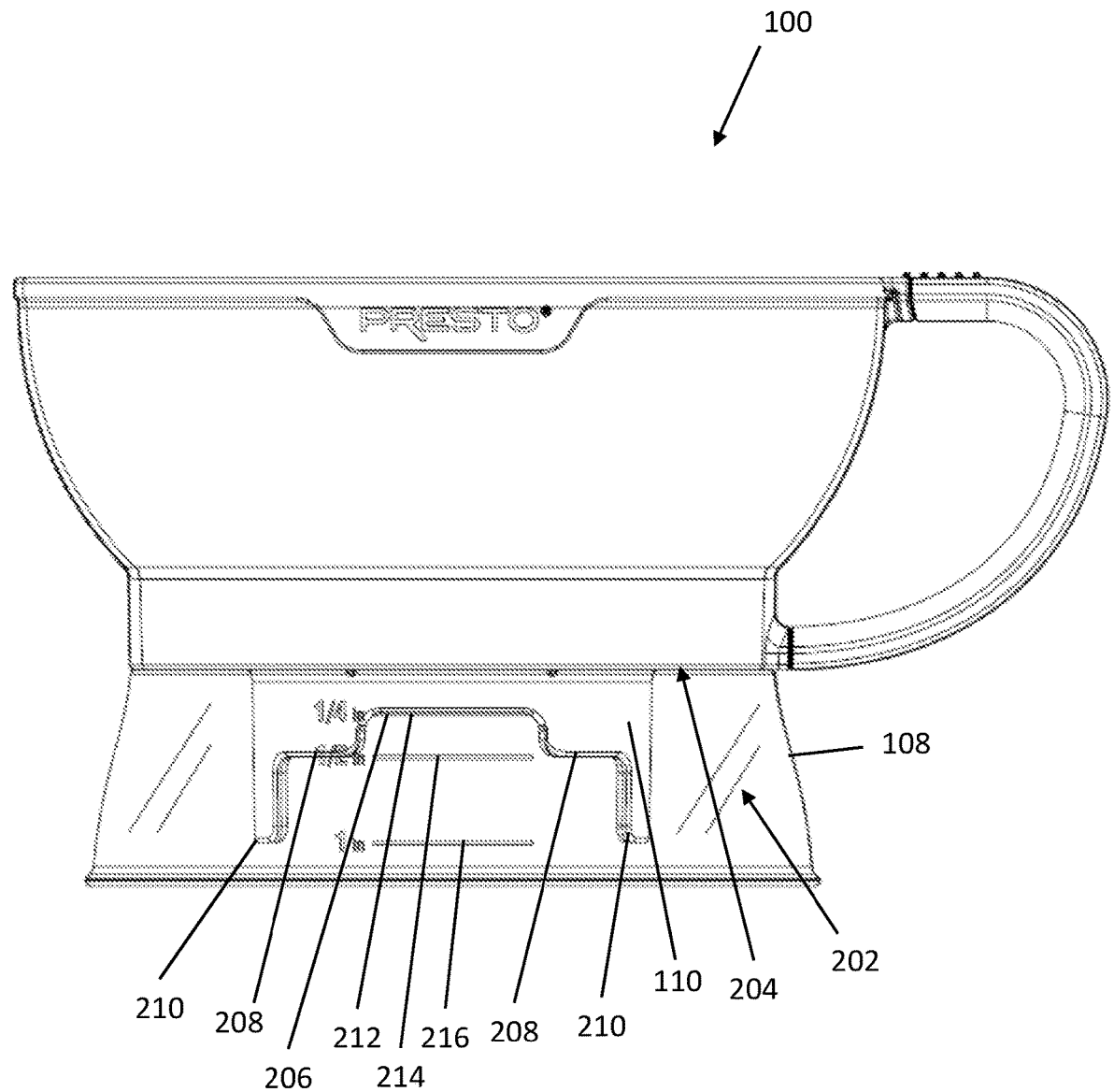
FIG. 2 is a front view of the funnel device of FIG. 1.

FIG. 2 illustrates a front view of the funnel device 100. Visible through a transparent outer base 108 is the inner positioning portion 110. In certain exemplary embodiments, this inner positioning portion serves to center the funnel device 100 in the opening of a canning jar (not shown). As illustrated, the inner positioning portion 110 is cylindrical with open ends (tubular). When in use, the funnel device 100 is positioned such that the inner positioning portion 110 is placed inside the opening of the canning jar. In such an orientation, an upper rim of the canning jar enters a spaced 202 between the inner positioning portion 110 and the outer base 108. In order to establish a repeatable orientation, the upper rim of the canning jar contacts a flange portion 204 that extends from the inner positioning portion 110 to the outer base 108 thereby orienting the upper rim of the canning jar relative to the inner positioning portion 110 regardless of the size of the canning jar. As is visible in FIG. 2, the exemplary embodiment of the inner positioning portion 110 shown has an opening formed in a side wall of the inner positioning portion 110, the illustrated opening has three horizontal edges (206, 208, and 210) visible through the outer base 108 which is formed from a transparent material to allow viewing of the horizontal edges. The first edge 206 represents a distance of ¼ inch from the flange portion 204 and thus the upper rim of the canning jar to the first edge 206. The second edge 208 represents a distance of ½ inch from the flange portion 204 to the second edge 208, and the third horizontal edge 210 represents a distance of 1 inch from the flange portion 204. In FIG. 2 these distances are shown by horizontal alignment marks 212, 214, and 216 formed in the outer base 108. Note that the uppermost horizontal alignment mark 212 is aligned with the uppermost horizontal edge 206 when the funnel device is level and viewed from the front or rear. The illustrated horizontal edges and marks are exemplary and in certain other exemplary embodiments, a greater or fewer number of horizontal edges and marks may be present and other distances may be represented by those edges. When canning foodstuffs using a steam canning method, a space between the upper portion of foodstuffs or liquids and the upper edge of the canning jar opening is formed to allow for expansion of the foodstuffs and liquids in the canning jar as the canning process takes place. This space is frequently referred to as headspace and varies depending on the foodstuffs that have been placed in the canning jar for processing. When placed on a canning jar, a viewer may discern headspace distances from the upper edge of the canning jar opening using the horizontal edges and marks.

Figure 3:
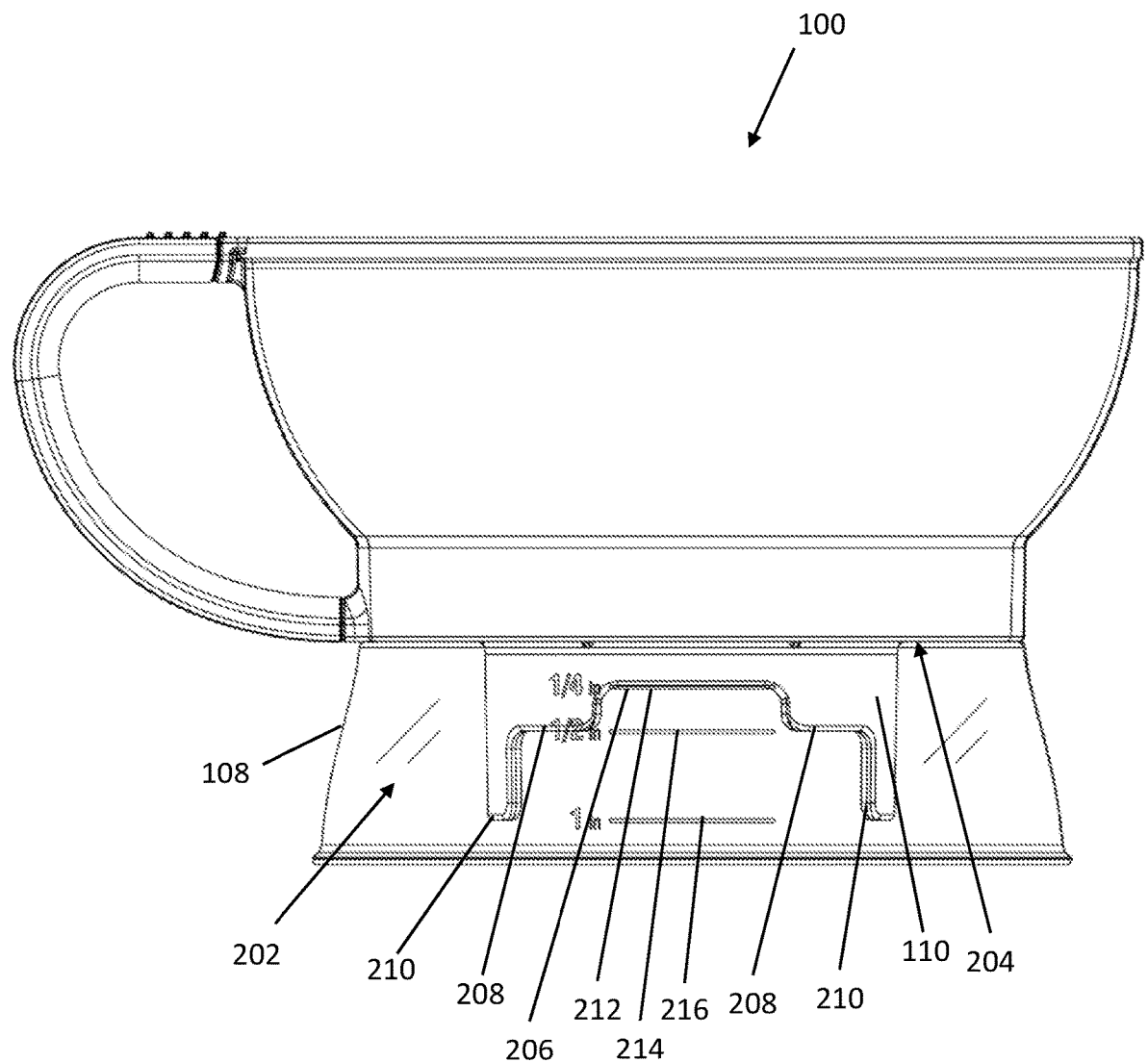
FIG. 3 is a rear view of the funnel device of FIG. 1.
Figure 4:
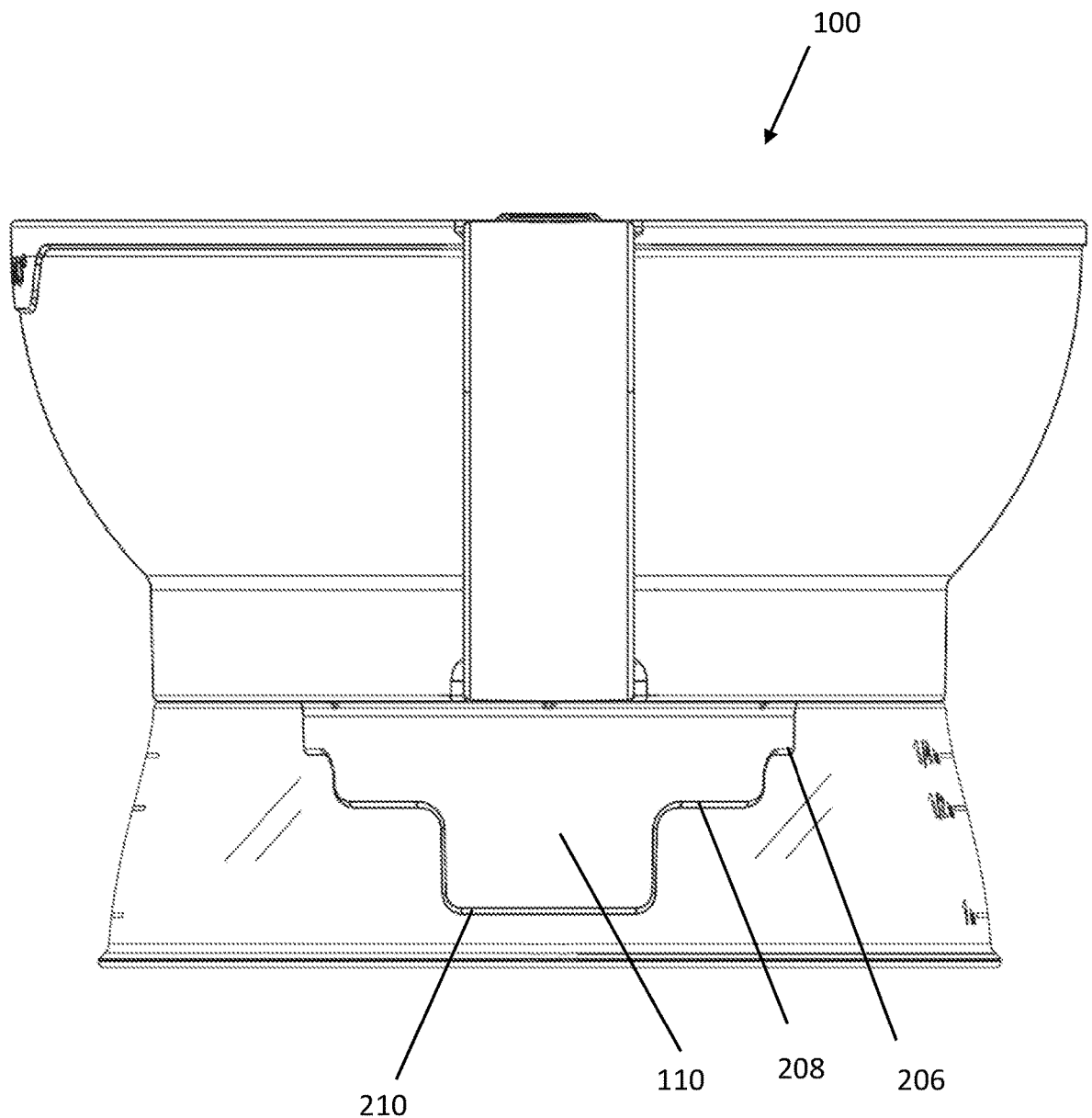
FIG. 4 is a right-side view of the funnel device of FIG. 1.
Figure 5:
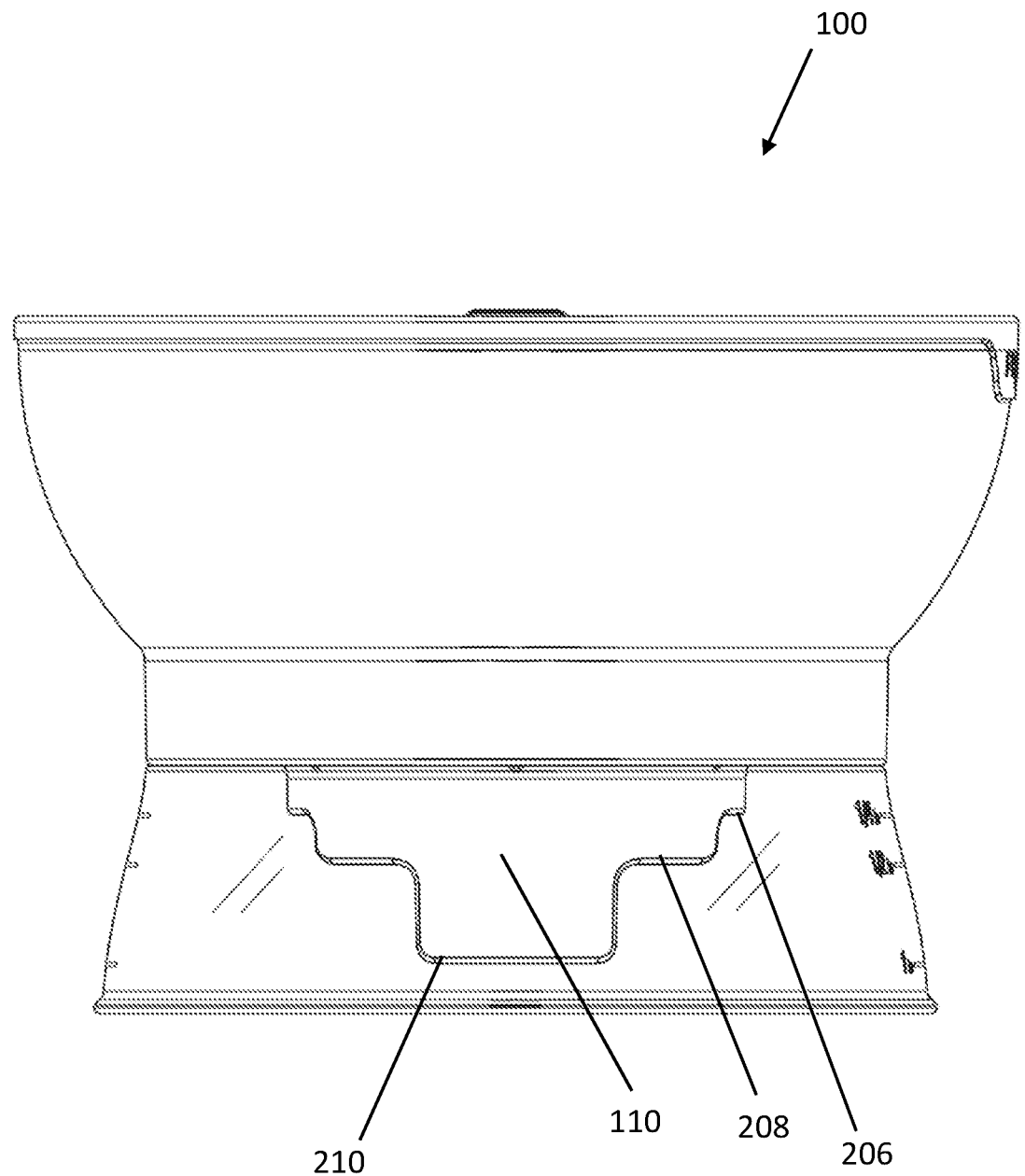
FIG. 5 is a left-side view of the funnel device of FIG. 1.
Figure 6:
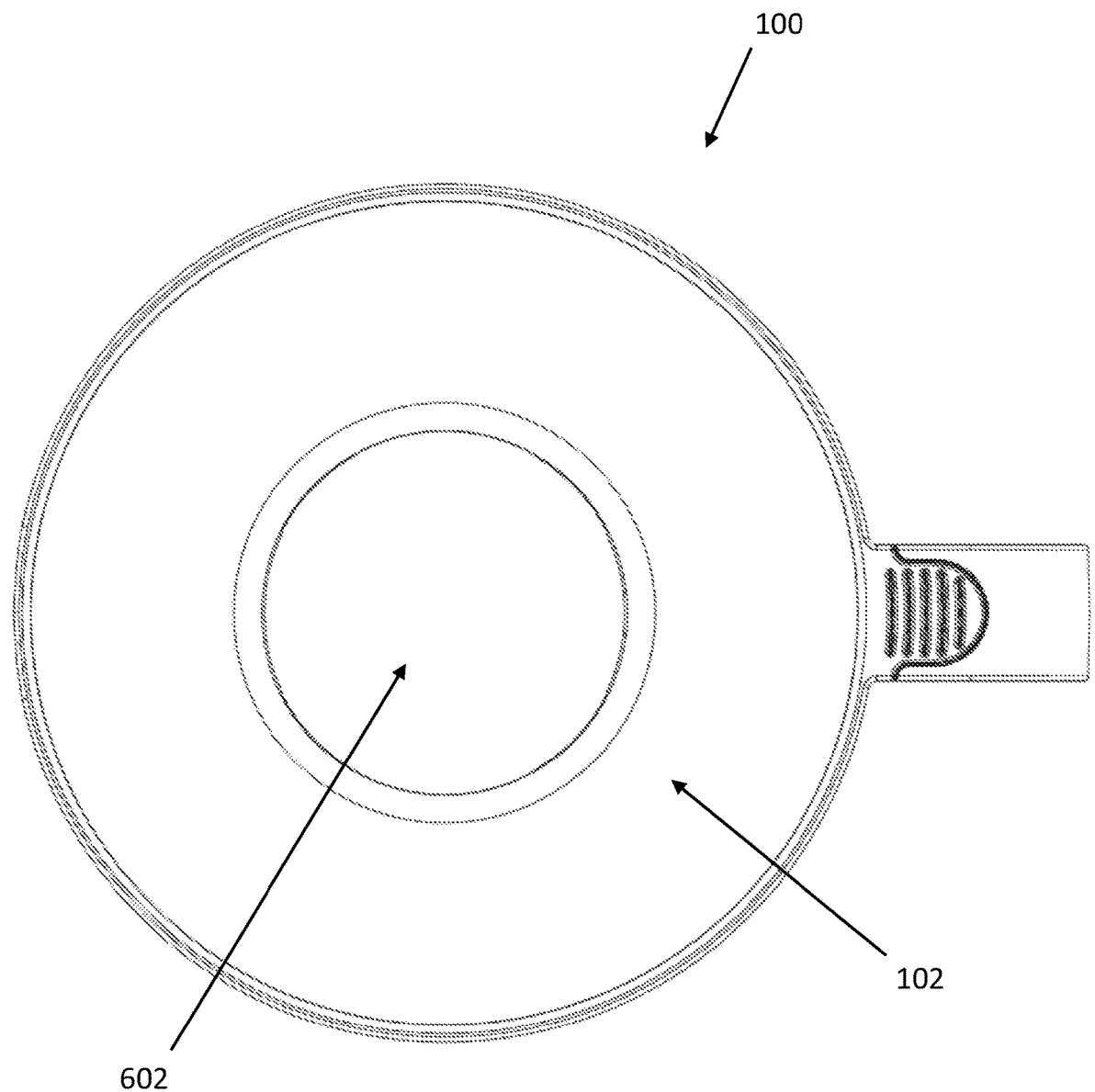
FIG. 6 is a top view of the funnel device of FIG. 1.
Figure 7:
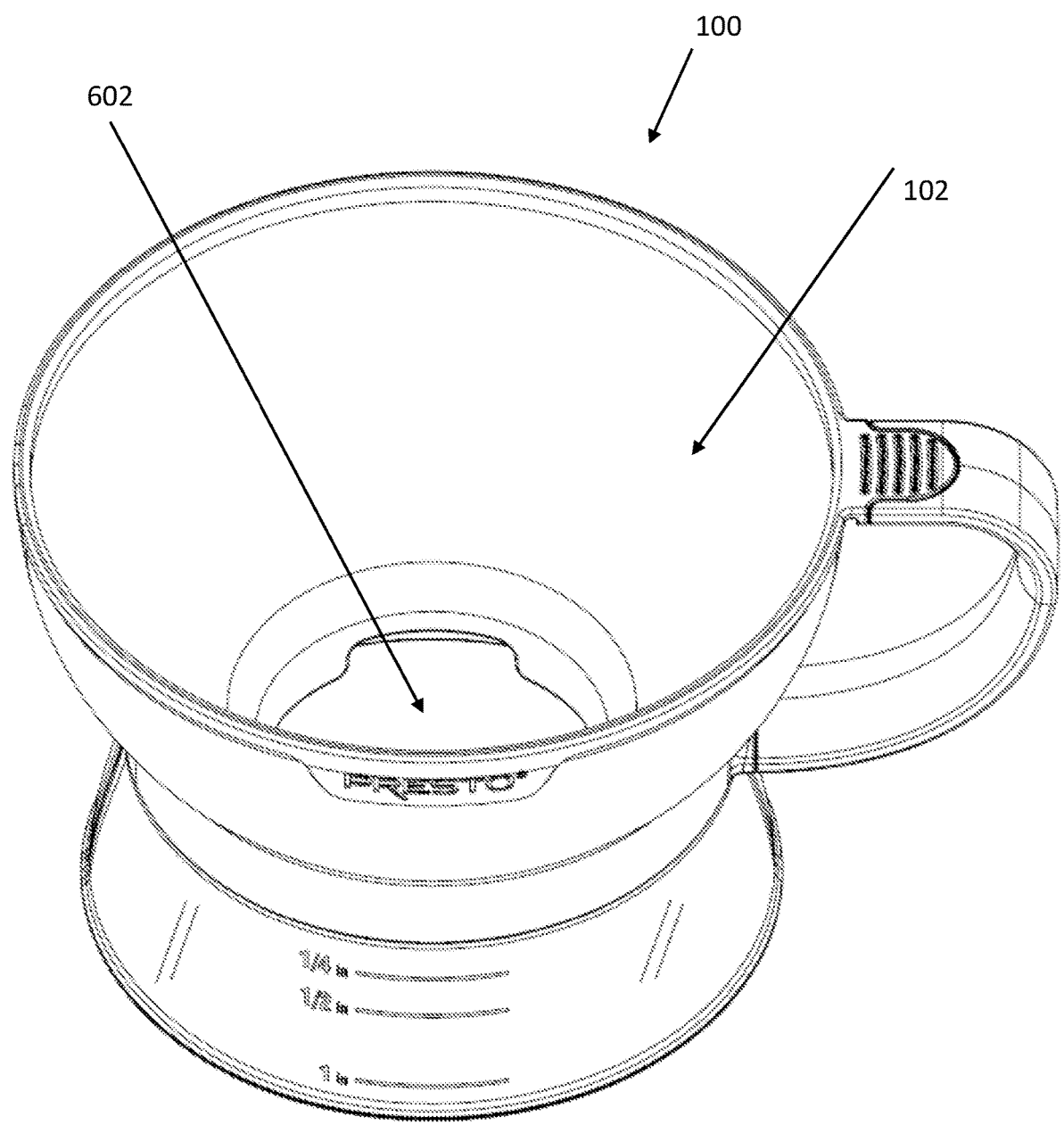
FIG. 7 is a top perspective view of the funnel device of FIG. 1.
Figure 8:
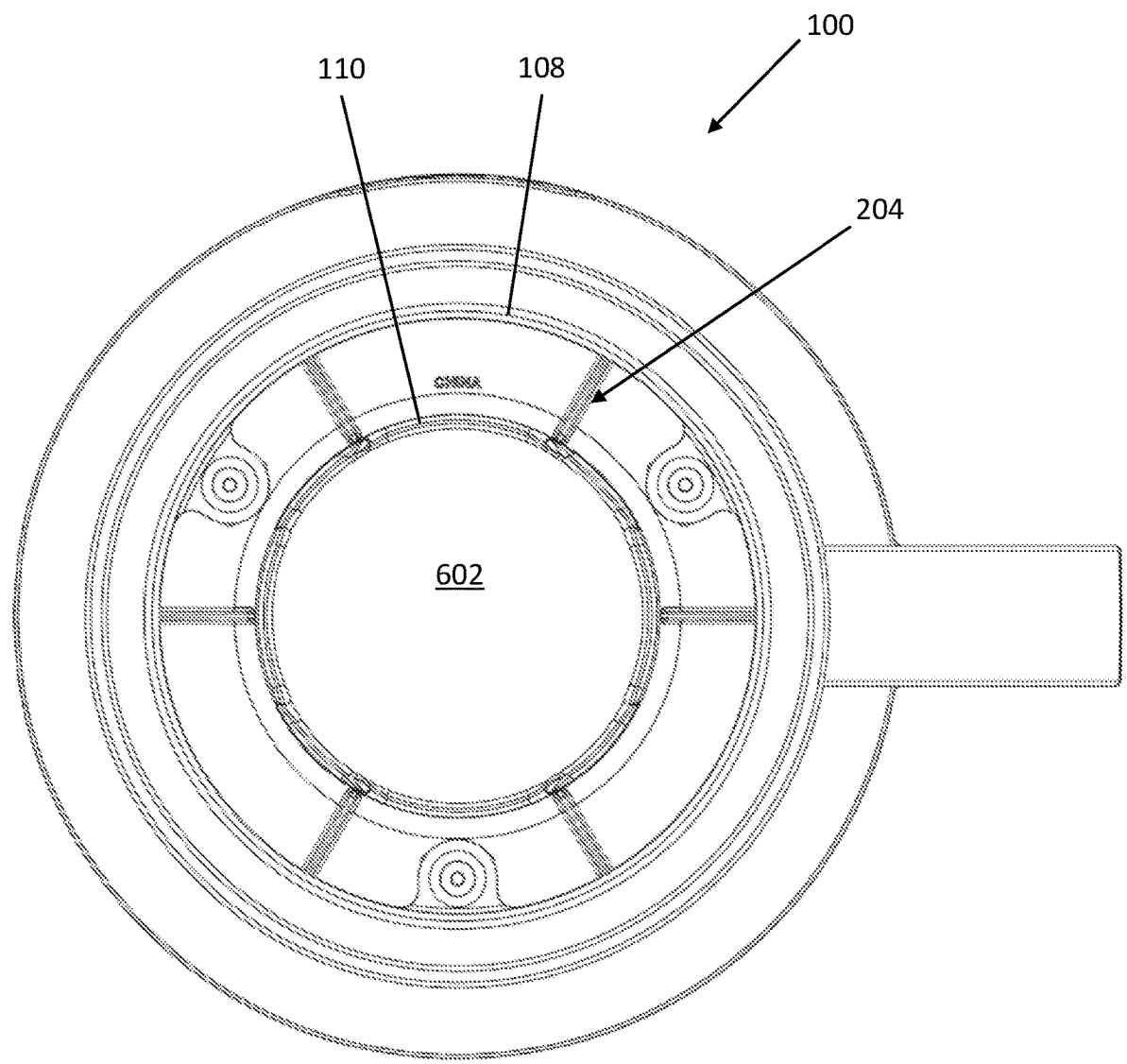
FIG. 8 is a bottom view of the funnel device of FIG. 1.
Figure 9:
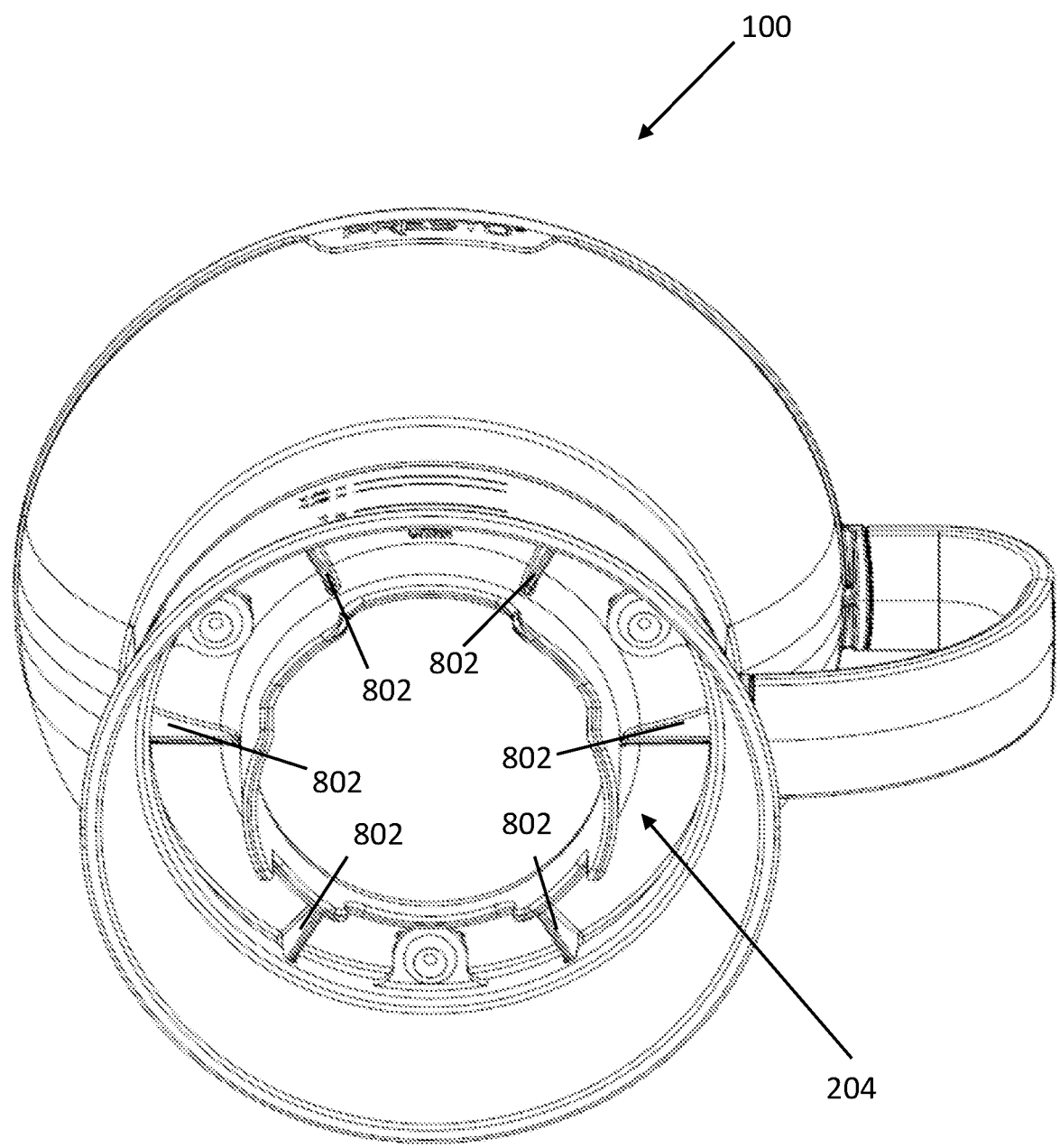
FIG. 9 is a bottom perspective view of the funnel device of FIG. 1.

In use, the exemplary canning jar funnel 100 is placed on a canning jar such that the flange 204 rests atop the canning jar. Foodstuffs or liquids may then be placed into the receiving bowl 102. The slope of the receiving bowl walls will cause foodstuffs or liquids will move along the inner surface of the receiving bowl 102, through the inner positioning portion 110, falling into the canning jar, guided by the inner surface of the receiving bowl 102 and inner positioning portion 110. Foodstuffs or liquids are added until their upper surface corresponds to a horizontal edge 206, 208, or 210. This establishes the headspace which can be adjusted by the viewer performing the canning operation. When the necessary headspace is achieved, the canning funnel 100 is removed from the canning jar and a lid and lid ring are placed on the canning jar to cover the opening of the canning jar during the processing stage. FIG. 3 shows a rear view of the canning jar funnel 100. As is illustrated in FIG. 4, the inner positioning portion 110 of an exemplary embodiment of the canning funnel has horizontal edges (206, 208, and 210) at two positions on the inner positioning portion 110 such that the user can view the horizontal edges (206, 208, and 210) from the front as was illustrated in FIG. 2 and also from the back of the canning funnel as shown in FIG. 3 as would be the case if the funnel were positioned with a user's left hand. This enables a user to see the upper edge of the foodstuffs or liquid with the additional benefit of allowing the use of the canning funnel 100 in either a left-handed or right-handed orientation. FIG. 5 shows the left-side view of canning funnel 100. FIG. 6 and FIG. 7 illustrate the canning funnel 100 from a top view and top perspective view. These views clearly illustrate the opening 602 formed at the lower edge of the receiving bowl 102. Thus, the receiving bowl provides a large area into which the user may insert or pour foodstuffs or liquids for placement into the canning jar. As shown in the bottom view of the canning jar depicted in FIG. 8, the inner positioning portion 110 is adjacent to the opening 602. The flange 204 which is supported by the upper portion of a jar when the canning funnel 100 is in use is shown between the inner position portion 110 and the outer base 108. As is illustrated in FIG. 9, the flange 204 may comprise a series of radial ribs 902 or in alternative embodiments, may be a flat surface such that the upper rim of the canning jar supports the canning funnel 100 during use. The radial ribs 902 create openings between the flange 204 and the upper portion of a canning jar which allow steam to escape from the canning jar as foodstuffs or liquids are added.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference numbers, the reference numbers have been included to increase the intelligibility of the drawings, detailed description, and claims. Accordingly, neither the reference numbers nor their absence have any limiting effect on the scope of any claim elements.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the Figures. The orientation of various elements may differ according to other exemplary embodiments, and that such variations are intended to be encompassed by the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, locations, etc. have been described for use with disclosed embodiments, others besides those disclosed may be utilized without exceeding the scope of the claimed inventions.

What is claimed is:

1. A device for filling canning jars, the device comprising:
a receiving bowl having an upper rim and a neck portion;
a tubular inner positioning portion extending from the neck portion in a direction away from the receiving bowl;
an outer base affixed to the receiving bowl and coaxial to the inner positioning portion;
a flange portion positioned between the outer base and the inner positioning portion, the flange portion arranged to permit the device to be supported by an upper surface of a canning jar during use; and
the tubular inner positioning portion having a first opening formed in a side wall of the inner positioning portion, the first opening having an edge formed at a region along the opening such that at least three edges are formed by the opening, the formed edges being parallel to the diameter of the flange portion, each edge being positioned at a discrete distance from the flange portion relative to the other edges.

2. The device of claim 1, is configured such that when supported by an upper surface of a canning jar, the inner positioning portion at least partially enters into the interior of the canning jar.

3. The device of claim 2, wherein the formed edges represent discrete distances from the upper surface of the canning jar.

4. The device of claim 1, wherein the tubular inner positioning portion comprises a second opening formed in a side wall of the inner positioning portion, the second opening being diametrically opposed from the first opening, the second opening having an edge formed in a region along the opening such that at least three edges are formed by the opening, each edge formed by the second opening being positioned at a discrete distance from the flange portion relative to the other edges formed by the second opening, the formed edges being perpendicular to an axis of the neck portion of the receiving bowl.

5. The device of claim 1, wherein the outer base is at least partially transparent.

6. The device of claim 5, wherein the outer base further comprises indicators that represent discrete distances from the upper surface of the canning jar.

7. The device of claim 1, wherein the diameter of the receiving bowl is larger at its upper rim than at its neck portion.

8. The device of claim 1, wherein inner walls of the receiving bowl have a decreasing slope as they approach the neck portion.

9. The device of claim 1, wherein the flange comprises radial ribs that provide surfaces that contact the upper surface of the canning jar.

10. The device of claim 1, wherein the outer base has a first diameter adjacent to the receiving bowl and a second diameter opposite of the receiving bowl.

11. The device of claim 10, wherein the second diameter of the outer base is less than a diameter at the upper rim of the receiving bowl and greater than a diameter of the neck portion of the receiving bowl.

12. A method of filling a canning jar to a predetermined depth, comprising:
placing a filling device on an upper rim of a canning jar such that the upper rim supports a flange portion of the filling device, the flange being located between a tubular inner positioning portion and an outer base portion of the filling device;
adding at least one of foodstuffs or liquids to the canning jar;
observing the level of foodstuffs or liquids through the outer base portion of the filling device to determine if the level reaches a level of an indicator formed by the tubular inner positioning device by viewing the indicator such that it is aligned with a horizontal alignment mark formed in the outer base portion, and observing the level of foodstuffs relative to the indicator.

13. The method of claim 12, wherein the outer base portion is at least partially transparent.

14. The method of claim 12, wherein the step of placing the filling device on the upper rim of a canning jar further comprises the substep of placing the inner tubular positioning portion into an opening formed by the upper rim of the canning jar.

15. A device for filling canning jars, the device comprising:
a receiving bowl having an upper rim and a neck portion;
a tubular inner positioning portion extending from the neck portion in a direction away from the receiving bowl;
a transparent outer base affixed to the receiving bowl and coaxial to the inner positioning portion;
a flange portion positioned between the outer base and the inner positioning portion, the flange portion comprising radial ribs that provide surfaces arranged such that the device is supported by the radial ribs on an upper surface of a canning jar during use; and
the tubular inner positioning portion having two openings formed in a side wall of the inner positioning portion, a second opening being diametrically opposed from a first opening, the openings having an edge formed at a point along the opening such that at least three edges are formed by each opening, the formed edges being perpendicular to an axis of the neck portion of the receiving bowl, each edge formed in the first opening being positioned at a unique distance from the flange portion relative to the other edges formed in the first opening and each edge formed in the second opening being positioned at a unique distance from the flange portion relative to the other edges formed in the second opening.

* * * * *